United States Patent
Ely et al.

(10) Patent No.: US 11,509,192 B2
(45) Date of Patent: *Nov. 22, 2022

(54) ELECTRIC MOTOR CONNECTIONS FOR POWER TOOLS

(71) Applicant: INGERSOLL-RAND INDUSTRIAL U.S., INC., Davidson, NC (US)

(72) Inventors: Sean C Ely, Flemington, NJ (US); Jason Christopher Bartoszek, Bethlehem, PA (US); Douglas Fornell Leavitt, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 429 days.

This patent is subject to a terminal disclaimer.

(21) Appl. No.: 16/653,772

(22) Filed: Oct. 15, 2019

(65) Prior Publication Data

US 2020/0083781 A1  Mar. 12, 2020

Related U.S. Application Data

(63) Continuation of application No. 15/995,644, filed on Jun. 1, 2018, now Pat. No. 10,447,113, which is a
(Continued)

(51) Int. Cl.
*H02K 7/14* (2006.01)
*H02K 5/22* (2006.01)
(Continued)

(52) U.S. Cl.
CPC ............ *H02K 7/145* (2013.01); *H02K 5/225* (2013.01); *H02K 11/0094* (2013.01); *H02K 11/30* (2016.01); *H02K 2203/06* (2013.01)

(58) Field of Classification Search
CPC ............... H02K 5/225; H02K 2203/06; H02K 11/0094; H02K 11/30; H02K 7/145
(Continued)

(56) References Cited

U.S. PATENT DOCUMENTS

| 5,037,333 A | 8/1991 | Baubles |
| 6,664,678 B2 | 12/2003 | Shimizu |

(Continued)

FOREIGN PATENT DOCUMENTS

| CN | 2845206 Y | 12/2006 |
| CN | 201352479 Y | 11/2009 |

(Continued)

OTHER PUBLICATIONS

China Office Action dated Jun. 12, 2018; Application No. 20151 0379335.3; Applicant, Ingersoll-Rand Company.
(Continued)

*Primary Examiner* — Forrest M Phillips
(74) *Attorney, Agent, or Firm* — Kevin E. West; Advent, LLP

(57) ABSTRACT

In at least one illustrative embodiment, a power tool may comprise an electric motor comprising a rotor configured to rotate about an axis, a stator assembly including at least three windings arranged around the rotor, and at least three lugs affixed to the stator assembly, where each of the lugs is electrically coupled to one or more of the windings. The lugs may all be arranged to one side of a plane that passes through the axis. The power tool may further comprise at least three electrical wires, where each of the electrical wires is removably coupled to one of the lugs, and a control circuit configured to supply electrical power to the windings, via the electrical wires and the lugs, to drive rotation of the rotor about the axis.

20 Claims, 4 Drawing Sheets

Related U.S. Application Data continuation of application No. 14/742,527, filed on Jun. 17, 2015, now Pat. No. 9,991,762.

(60) Provisional application No. 62/019,863, filed on Jul. 1, 2014.

(51) Int. Cl.
*H02K 11/30* (2016.01)
*H02K 11/00* (2016.01)

(58) Field of Classification Search
USPC .......................................................... 310/50
See application file for complete search history.

(56) References Cited

U.S. PATENT DOCUMENTS

| | | | | |
|---|---|---|---|---|
| 7,317,269 | B2 * | 1/2008 | Boyland | H02K 5/225 310/71 |
| RE42,926 | E * | 11/2011 | Norwood | H01R 13/641 439/314 |
| 8,269,386 | B2 | 9/2012 | Kaiser et al. | |
| 8,648,507 | B2 | 2/2014 | Chamberlin et al. | |
| 9,991,762 | B2 * | 6/2018 | Bartoszek | H02K 7/145 |
| 10,447,113 | B2 * | 10/2019 | Bartoszek | H02K 5/225 |
| 2008/0106159 | A1 * | 5/2008 | Yoshida | H02K 9/22 310/64 |
| 2012/0178317 | A1 * | 7/2012 | Skidmore | H01R 13/111 29/876 |
| 2013/0207491 | A1 | 8/2013 | Hatfield et al. | |
| 2013/0270934 | A1 * | 10/2013 | Smith | H02K 7/145 310/50 |

FOREIGN PATENT DOCUMENTS

| | | |
|---|---|---|
| CN | 202004180 U | 10/2011 |
| CN | 202167653 U | 3/2012 |
| CN | 103199648 A | 7/2013 |

OTHER PUBLICATIONS

English Translation of China Office Action dated Jun. 12, 2018; Application No. 201510379335.3; Applicant, Ingersoll-Rand Company.

Office Action for Chinese Application No. 201910829447.2, dated Nov. 27, 2020.

* cited by examiner

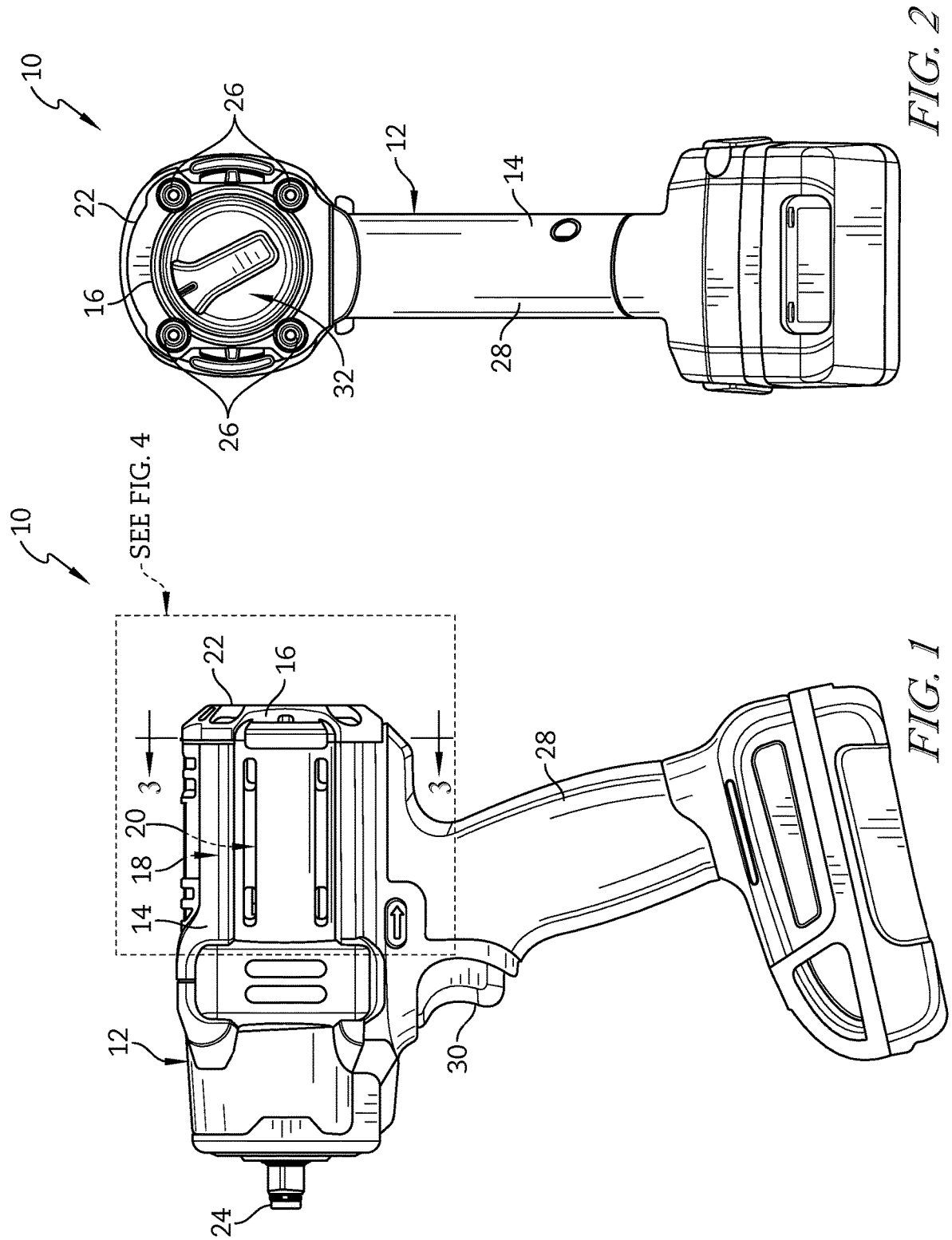

ELECTRIC MOTOR CONNECTIONS FOR POWER TOOLS

CROSS REFERENCE TO RELATED APPLICATIONS

This Application is a Continuation Patent Application of U.S. patent application Ser. No. 15/995,644, entitled "Electric Motor Connections for Power Tools," filed on Jun. 1, 2018, which is a continuation of and also claims benefit of U.S. patent application Ser. No. 14/742,527, entitled "Electric Motor Connections for Power Tools," filed on Jun. 17, 2015; this Application also claims the benefit of U.S. Provisional Patent Application No. 62/019,863, filed Jul. 1, 2014 and entitled "Electric Motor Connections for Power Tools," which is incorporated by reference herein in its entirety.

TECHNICAL FIELD

The present disclosure relates, generally, to power tools and, more particularly, to electric motor connections for power tools.

BACKGROUND

Electric motors used in power tools—by way of example, brushless direct current ("DC") motors—typically require connection to three heavy gauge "phase" wires that supply the high electrical current that drives the motor. In many existing power tools, this connection is often accomplished by soldering the phase wires to a printed circuit board ("PCB") inside the motor. Traces on the PCB then conduct the high electrical current from the phase wires to soldered termination points where stator windings of the motor are coupled to the PCB. Servicing the motor in such designs may be difficult because de-soldering the phase wires from the PCB can be time consuming and risks damage to the PCB.

Other power tool designs have provided the connection between the phase wires and the stator windings of the motor via solder "lugs" that are mounted to an end of the motor. While such designs may improve serviceability, they have also increased the footprint of the motor (and, hence, the size of the power tool). First, the solder lugs in such designs add length to the motor assembly. Second, because the solder lugs in such designs have typically been spaced evenly around a circumference of the motor, one or more of the phase wires must often be routed around the motor for connection to the corresponding solder lug(s).

SUMMARY

According to one aspect, a power tool may comprise an electric motor comprising (i) a rotor configured to rotate about an axis, (ii) a stator assembly including at least three windings arranged around the rotor, and (iii) at least three lugs affixed to the stator assembly, wherein each of the lugs is electrically coupled to one or more of the windings. The lugs may all be arranged to one side of a plane that passes through the axis. The power tool may further comprise at least three electrical wires, wherein each of the electrical wires is removably coupled to one of the lugs, and a control circuit configured to supply electrical power to the windings, via the electrical wires and the lugs, to drive rotation of the rotor about the axis.

In some embodiments, each of the electrical wires may be soldered to one of the lugs. Each of the lugs may define a circular opening, and each of the electrical wires may be received by one of the circular openings to removably couple each of the electrical wires to one of the lugs. Each of the lugs may include a projection extending radially outward from the stator assembly and defining the circular opening. Each of the electrical wires may be surrounded by one of the projections when each of the electrical wires is received by one of the circular openings. Each projection may include an annular wall that defines the circular opening. An outer perimeter of each projection may circumscribe a generally rectangular or circular shape.

In other embodiments, each of the lugs may include a fastener, and each of the electrical wires may be coupled to one of the lugs by the corresponding fastener. In still other embodiments, each of the lugs may include a female receptacle, and each of the electrical wires may include a male plug configured to be received in one of the female receptacles. The stator assembly may further include a lamination stack that supports the windings. Each of the lugs may be affixed to an external surface of the lamination stack.

According to another aspect, a power tool may comprise an electric motor comprising (i) a rotor configured to rotate about an axis, (ii) a stator assembly including at least three windings arranged around the rotor, and (iii) at least three lugs affixed to the stator assembly, wherein each of the at least three lugs is electrically coupled to one or more of the windings. The at least three lugs may all be arranged to one side of a plane that passes through the axis. The power tool may further comprise at least three electrical wires, wherein each of the electrical wires is surrounded by one of the at least three lugs to removably couple each of the electrical wires to one of the at least three lugs.

In some embodiments, each of the electrical wires may be soldered to one of the at least three lugs. In other embodiments, each of the at least three lugs may include a fastener, and each of the electrical wires may be coupled to one of the at least three lugs by the corresponding fastener. In still other embodiments, each of the at least three lugs may include a female receptacle, and each of the electrical wires may include a male plug configured to be received in one of the female receptacles.

According to another aspect, an electric motor may comprise a rotor configured to rotate about an axis, a stator assembly including at least three windings arranged around the rotor, and at least three lugs affixed to the stator assembly, each of the at least three lugs being electrically coupled to one or more of the windings. Each of the at least three lugs may include a projection extending radially outward from the stator assembly. The projection may define a circular opening configured to receive an electrical wire. The projections of the at least three lugs may all be arranged to one side of a plane that passes through the axis.

In some embodiments, each projection may include an annular wall that defines the circular aperture. Each projection may further include a pair of planar faces arranged opposite one another and interconnected by the annular wall. An outer perimeter of each of the pair of planar faces may circumscribe a generally rectangular shape. In other embodiments, an outer perimeter of each of the pair of planar faces may circumscribe a generally circular shape. The stator assembly may further include a lamination stack that supports the windings. Each of the at least three lugs may be affixed to an external surface of the lamination stack.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

FIG. 1 is a side elevation view of an illustrative power tool;

FIG. 2 is an end elevation view of the power tool of FIG. 1;

Figure 4:
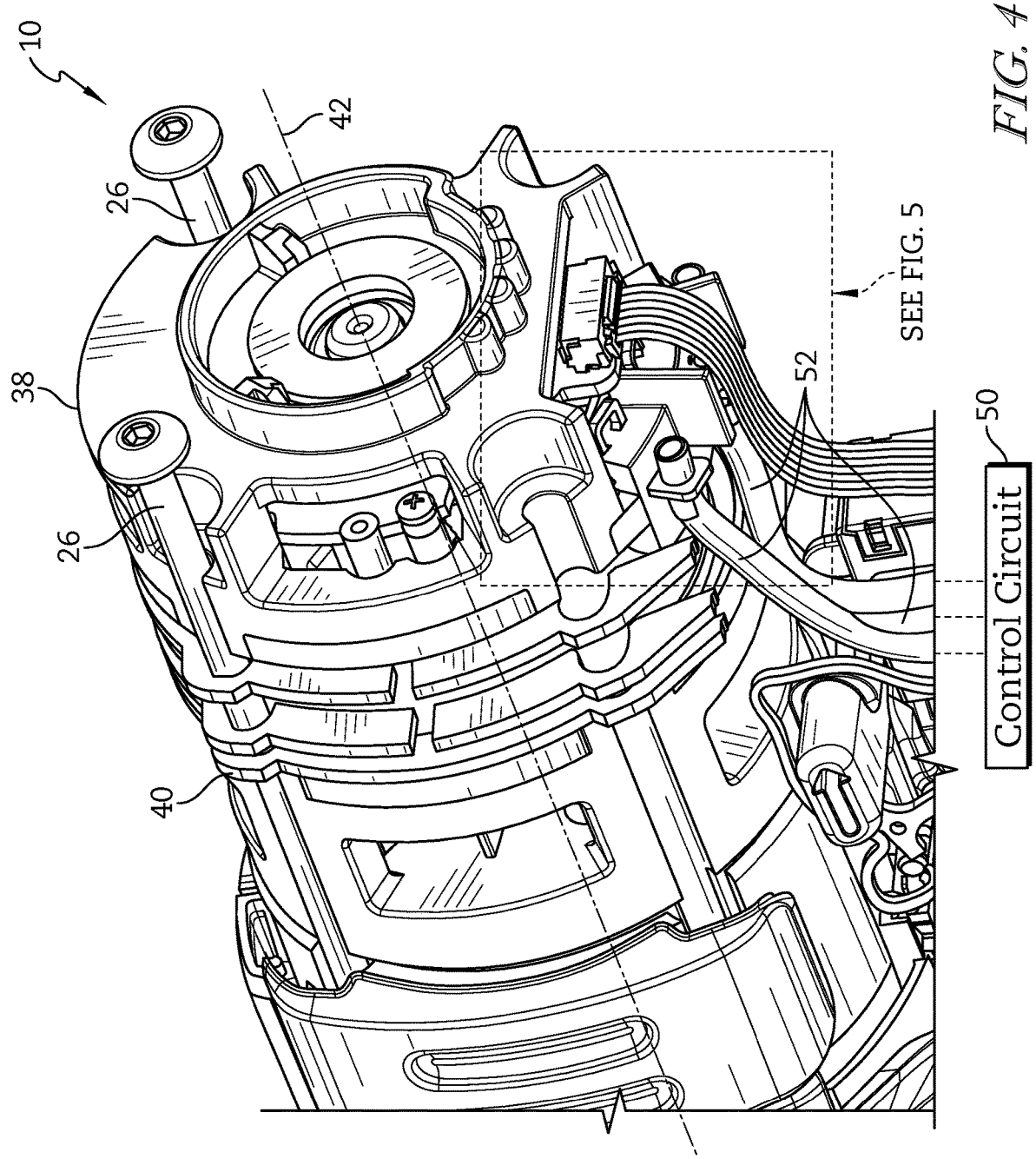
Figure 5:
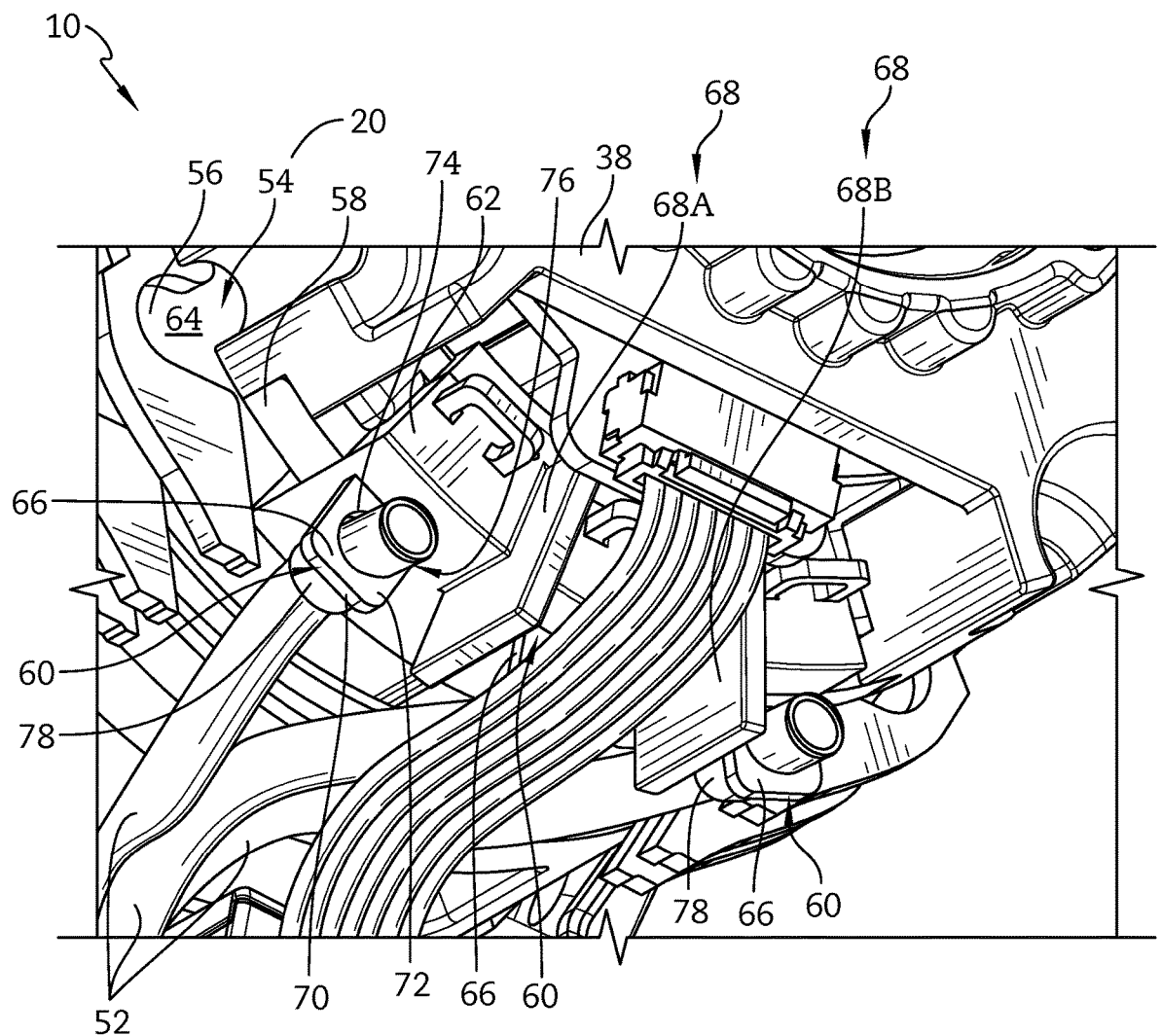

FIG. 4 is a partial perspective view of various components associated with the electric motor of the power tool of FIG. 1 with remaining portions of the power tool omitted for the sake of clarity; and FIG. 5 is a magnified, partial perspective view of various components associated with the electric motor of the power tool of FIG. 1 with remaining portions of the power tool omitted for the sake of clarity.

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring now to FIG. 1, an illustrative power tool 10 is shown. The power tool 10 is illustratively embodied as a cordless, electric power tool (in particular, an electric, pistol-style impact tool). In various embodiments, the power tool 10 may be embodied as a pistol-grip impact tool, an in-line impact tool, or an angle impact tool, such as a right-angle impact tool. It should be appreciated, however, that in other embodiments, the power tool may be embodied as a cordless, electric power tool that does not include an impact mechanism, such as an electric drill, drill driver, ratchet, saw, or the like.

The illustrative power tool 10 includes a tool housing 12 as shown in FIG. 1. The tool housing 12 includes a body 14 and a back cap 16. The body 14 defines an interior space 18 in which an electric motor 20 of the power tool 10 is positioned. The back cap 16 is coupled to the body 14 when the power tool 10 is assembled to close off the interior space 18 and define a back end 22 that is positioned opposite an output end 24 of the power tool 10. The back cap 16 is coupled to the body 14 using fasteners 26 (best seen in FIG. 2) that extend through the back cap 16 and into the interior space 18.

The body 14 of the tool housing 12 defines a handle 28 on which a trigger 30 is provided as shown in FIG. 1. The trigger 30 is used to turn the electric motor 20 on/off and to control a speed of the electric motor 20 during use of the power tool 10. A user interface 32 spaced from the trigger 30 is also provided on the tool housing 12, specifically on the back cap 16, as best seen in FIG. 2. In the illustrative embodiment, the user interface 32 is used to select one of a plurality of modes of operation of the power tool 10. For instance, in some embodiments, the user interface 32 may be used to select a particular mode of operation from among those described in U.S. Provisional Patent Application Ser. No. 62/171,504, filed Jun. 5, 2015. In other embodiments, the user interface 32 may simply regulate the maximum power supplied to the electric motor 20 when the trigger 30 is fully depressed.

Figure 3:
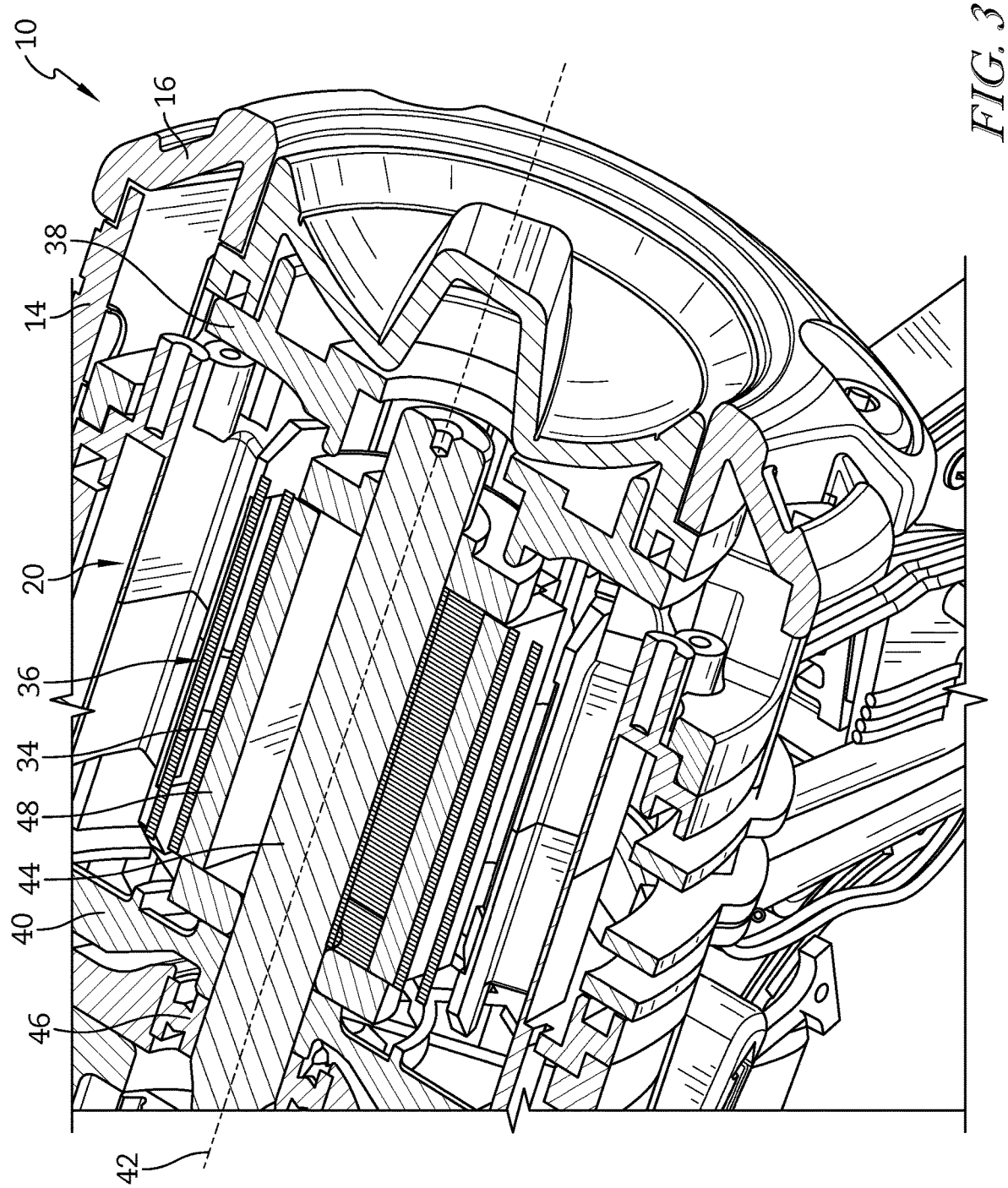
FIG. 3 is a magnified sectional view, taken about line 3-3 of FIG. 1, of an electric motor included in the power tool with remaining portions of the power tool omitted for the sake of clarity.

Referring now to FIG. 3, the body 14 and the back cap 16 are broken away to show components of the electric motor 20. The electric motor 20 is illustratively embodied as a brushless DC motor. As such, the motor 20 generally includes a rotor 34 for providing rotational energy (e.g., to a transmission or drive train of the power tool 10) and a stator 36 for supplying a rotating magnetic field that drives rotation of the rotor 34. The motor 20 also includes a rear endbell 38 and a front endbell 40 that is spaced from the endbell 38 and positioned closer to the output end 24 of the power tool 10 than the endbell 38. The endbells 38, 40 cooperate to align the rotor 34 and the stator 36 so that the rotor 34 and the stator 36 extend parallel to an axis 42. The rotor 34 includes a shaft 44 supported on at least one end by a bearing 46, such that the rotor 34 is configured to rotate about the axis 42. Additionally, the rotor 34 includes one or more permanent magnet(s) 48 that generate a magnetic field.

Referring now to FIG. 4, the power tool 10 illustratively includes a control circuit 50 (shown diagrammatically), and a number of "phase" wires 52 electrically coupling the control circuit 50 to the motor 20. In the illustrative embodiment, the control circuit 50 is positioned in the handle 28 of the power tool 10. It will be appreciated that the power tool 10 includes one or more additional components typically found in power tools (e.g., a transmission or drive train), which are not shown in the drawings or described herein.

Referring now to FIG. 5, the motor 20 includes a stator assembly 54 that has a number of windings arranged around the rotor 34, with an air-gap therebetween. In the illustrative embodiment (i.e., a four-pole, six-tooth, three-phase brushless DC motor), the stator assembly 54 includes three windings that are distributed around the axis 42 to form an even number of poles. In particular, each stator winding includes a pair of windings arranged on opposite sides of the axis 42. The stator windings may be electrically connected to one another in a variety of configurations, including, but not limited to, a series delta configuration, a parallel delta configuration, a series wye (Y-shaped) configuration, and a parallel wye configuration.

As shown in FIG. 5, the stator assembly 54 further includes a lamination stack 56 that supports (and generally surrounds) the stator windings. The stator assembly 54 also includes a pair of insulators 58 (only one of which is shown in FIG. 4) arranged at opposite ends of the stator assembly 54 to insulate the stator windings from other components of the motor 20.

During operation of the motor 20, when electrical power is selectively supplied to one of the stator windings (by the control circuit 50 via one of the electrical wires 52), the resulting current in the stator winding generates a magnetic field that couples to the rotor 34. The magnetic field associated with the permanent magnet(s) in the rotor 34 attempts to align itself with the magnetic field generated by the stator 36, resulting in rotational movement of the rotor 34. The control circuit 50 may sequentially activate the stator windings so that the permanent magnet(s) 48 of the rotor 34 continuously chase(s) the advancing magnetic field generated by the stator windings. The illustrative embodiment of motor 20 also includes a sensor, such as a Hall Effect sensor, that provides a signal to the control circuit 50 that is indicative of a current position of the rotor 34 (relative to the stator 36). The control circuit 50 may utilize this signal when sequentially activating the stator windings to maintain proper timing of the commutation sequence.

In the illustrative embodiment of FIG. 5, the motor 20 further includes a number of solder lugs 60, or electrical terminals, affixed to the stator assembly 54. Each of the solder lugs 60 extends radially outward from a base block 62 that is affixed to one of the insulators 58 of the stator assembly 54 as well as to an external surface 64 of the lamination stack 56 of the stator assembly 54. It is contemplated that other mounting locations (e.g., the endbell 38) for the solder lugs 60 are possible. Each of the solder lugs 60 is electrically coupled to one or more of the stator windings. In the illustrative embodiment of FIG. 5, in which the stator assembly 54 includes three windings, the motor 20 also includes three solder lugs 60, with one solder lug 60 electrically coupled to each stator winding.

The solder lugs 60 may be formed of a metal, metal alloy, or any other material suitable for conducting current between the electrical wires 52 and the stator windings. In some embodiments, the solder lugs 60 may be permanently affixed to the stator assembly 54 (e.g., to the external surface 64 of the lamination stack 56) and/or permanently electrically coupled to the stator windings.

As best seen in FIG. 5, each of the solder lugs 60 includes a projection 66 that is coupled to and extends radially outward from the base block 62. Dividers 68 are coupled to the base block 62 and extend radially outward therefrom between the solder lugs 60. Specifically, one divider 68A extends radially outward from the base block 62 between one pair of the solder lugs 60, and another divider 68B extends radially outward from the base block 62 between another pair of the solder lugs 60.

The projections 66 illustratively have a generally rectangular shape as shown in FIG. 5. Specifically, an outer perimeter of each of the projections 66 circumscribes a generally rectangular shape. In other embodiments, however, the outer perimeter of each of the projections 66 may circumscribe a shape of another suitable geometric form. For example, the outer perimeter of each of the projections 66 may circumscribe a generally circular or trapezoidal shape.

Each projection 66 illustratively includes a planar face 70 and another planar face 72 positioned opposite the planar face 70 as shown in FIG. 5. The planar faces 70, 72 are interconnected by an annular wall 74. The annular wall 74 of each projection 66 defines a circular aperture 76 that extends through each of the planar faces 70, 72. The circular apertures 76 are sized to receive the electrical wires 52, as described in greater detail below.

As best seen in FIG. 5, each of the electrical wires 52 is inserted through one of the circular apertures 76 of the projections 66 such that each of the electrical wires 52 is surrounded by one of the projections 66. In that way, the projections 66 are configured to receive and support the electrical wires 52 when the power tool 10 is assembled (or re-assembled). While received and supported by the projections 66, each of the electrical wires 52 may be soldered to one of the solder lugs 60 to removably couple the electrical wires 52 to the solder lugs 60.

Prior to being soldered to the solder lugs 60, ferrules 78 may be placed in contact with the electrical wires 52 as shown in FIG. 5. Specifically, ferrules 78 may be crimped onto the electrical wires 52 to provide strain relief to the electrical wires 52 as well as prepare the electrical wires 52 for insertion through the circular apertures 76.

In the illustrative embodiment (best seen in FIG. 4), each of the solder lugs 60 is arranged below a centerline of the motor 20 (namely, the axis 42). In other words, the solder lugs 60 are all arranged to one side of a plane that passes through the axis 42. Using FIG. 4 as an example, the solder lugs 60 are all arranged below a plane that passes through the axis 42 and extends generally into and out of the page of FIG. 4. Furthermore, in the illustrative embodiment, the solder lugs 60 are all arranged within a footprint of the stator assembly 54, when viewed from a perspective orthogonal to that plane. This configuration provides for easier routing of the electrical wires 52 to the motor 20 and, thus, easier assembly of the power tool 10. This configuration also improves serviceability of the power tool 10 by allowing easier de-soldering/re-soldering of the electrical wires 52 from/to the motor 20. Furthermore, as the solder lugs 60 do not extend beyond the ends of the motor 20, the overall length of the power tool 10 may be reduced.

It is contemplated that, in other embodiments of the power tool 10, the solder lugs 60 may be replaced with another type of lug 60 that allows the electrical wires 52 to be removably coupled to the lugs 60. For instance, in some embodiments, each of the lugs 60 might include a fastener, such that each of the electrical wires 52 could be removably coupled to one of the lugs 60 by tightening the corresponding fastener (and de-coupled from the lug 60 by loosening the corresponding fastener). In still other embodiments, each of the lugs 60 might include a female receptacle and each of the electrical wires 52 might include a male plug that is configured to be received in one of the female receptacles to removably couple the electrical wires 52 to the lugs 60. By way of example, the male plugs of the electrical wires 52 might be secured in the female receptacles of the lugs 60 via friction forces.

While certain illustrative embodiments have been described in detail in the figure and the foregoing description, such an illustration and description is to be considered as exemplary and not restrictive in character, it being understood that only illustrative embodiments have been shown and described and that all changes and modifications that come within the spirit of the disclosure are desired to be protected. For instance, while the concepts of the present disclosure have been described primarily with reference to brushless DC motors, it is contemplated that the presently disclosed teachings may also be applied to other types of motors, such as brushed DC motors and/or alternating current motors.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A power tool comprising:
   an electric motor including a rotor configured to rotate about an axis, and a stator assembly including one or more windings disposed around the rotor;
   a housing for housing the electric motor, the housing including a body and a back cap, the body defining an interior space in which the electric motor is positioned, the back cap removably coupled to the body, the back cap positioned opposite to an output end of the power tool;
   two or more lugs coupled to the stator assembly, each lug electrically coupled to the one or more windings, each lug defining an aperture configured for receiving and electrically coupling to an electrical wire, the two or more lugs all arranged to one side of a plane that passes through the axis, the two or more lugs located proximate to the back cap, the two or more lugs accessible by removal of the back cap;

one or more dividers coupled to the stator assembly and extending radially outward from the stator assembly, each divider located between a lug and an adjacent lug among the two or more lugs; and two or more electrical wires for supplying electrical power to the one or more windings, each electrical wire removably coupled to a respective lug among the two or more lugs by passing each electrical wire through the aperture of the respective lug, each electrical wire electrically coupled to the respective lug through contact communication or a solder.

2. The power tool of claim 1, wherein each of the lugs includes a fastener and each of the electrical wires is coupled to each respective lugs by the corresponding fastener.

3. The power tool of claim 1, wherein the stator assembly further includes a lamination stack that supports the windings, each of the lugs coupled to an external surface of the lamination stack.

4. The power tool of claim 1, further comprising two or more ferrules, wherein each electrical wire extends into a respective ferrule among the two or more ferrules, each ferrule removably extending into the aperture of the respective lug to removably couple each wire to the respective lug.

5. The power tool of claim 4, wherein the two or more ferrules are configured such that each ferrule can be removed from the aperture of the respective lug while each electrical wire remains extended into the respective ferrule and while the respective lug remains coupled to the stator assembly.

6. The power tool of claim 5, wherein the two or more ferrules is to be selectively soldered, de-soldered, and re-soldered to each respective lug.

7. The power tool of claim 1, wherein each of the two or more lugs includes a female receptacle and each of the two or more electrical wires includes a male plug such that each female receptacle is configured to receive a respective male plug among the two or more electrical wires.

8. A power tool comprising:
an electric motor including a rotor configured to rotate about an axis, and a stator assembly including one or more windings disposed around the rotor;

a housing for housing the electric motor, the housing including a body and a back cap, the body defining an interior space in which the electric motor is positioned, the back cap removably coupled to the body, the back cap positioned opposite to an output end of the power tool;

two or more lugs coupled to the stator assembly, each lug electrically coupled to the one or more windings, each lug defining an aperture configured for receiving and electrically coupling to an electrical wire, the two or more lugs all arranged to one side of a plane that passes through the axis, the two or more lugs located proximate to the back cap, the two or more lugs accessible by removal of the back cap; and two or more electrical wires for supplying electrical power to the one or more windings, each electrical wire removably coupled to a respective lug among the two or more lugs by passing each electrical wire through the aperture of the respective lug, each electrical wire electrically coupled to the respective lug through contact communication or a solder.

9. The power tool of claim 8, wherein each of the lugs includes a fastener and each of the electrical wires is coupled to each respective lugs by the corresponding fastener.

10. The power tool of claim 8, wherein the stator assembly further includes a lamination stack that supports the windings, each of the lugs coupled to an external surface of the lamination stack.

11. The power tool of claim 8, further comprising two or more ferrules, wherein each electrical wire extends into a respective ferrule among the two or more ferrules, each ferrule removably extending into the aperture of the respective lug to removably couple each wire to the respective lug.

12. The power tool of claim 11, wherein the two or more ferrules are configured such that each ferrule can be removed from the aperture of the respective lug while each electrical wire remains extended into the respective ferrule and while the respective lug remains coupled to the stator assembly.

13. The power tool of claim 12, wherein the two or more ferrules is to be selectively soldered, de-soldered, and re-soldered to each respective lug.

14. The power tool of claim 8, wherein each of the two or more lugs includes a female receptacle and each of the two or more electrical wires includes a male plug such that each female receptacle is configured to receive a respective male plug among the two or more electrical wires.

15. A power tool comprising:
an electric motor including a rotor configured to rotate about an axis, and a stator assembly including one or more windings disposed around the rotor;

two or more lugs coupled to the stator assembly, each lug electrically coupled to the one or more windings, each lug defining an aperture configured for receiving and electrically coupling to an electrical wire, the two or more lugs all arranged to one side of a plane that passes through the axis;

one or more dividers coupled to the stator assembly and extending radially outward from the stator assembly, each divider located between a lug and an adjacent lug among the two or more lugs; and two or more electrical wires for supplying electrical power to the one or more windings, each electrical wire removably coupled to a respective lug among the two or more lugs by passing each electrical wire through the aperture of the respective lug, each electrical wire electrically coupled to the respective lug through contact communication or a solder.

16. The power tool of claim 15, wherein each of the lugs includes a fastener and each of the electrical wires is coupled to each respective lugs by the corresponding fastener.

17. The power tool of claim 15, wherein the stator assembly further includes a lamination stack that supports the windings, each of the lugs coupled to an external surface of the lamination stack.

18. The power tool of claim 15, further comprising two or more ferrules, wherein each electrical wire extends into a respective ferrule among the two or more ferrules, each ferrule removably extending into the aperture of the respective lug to removably couple each wire to the respective lug.

19. The power tool of claim 18, wherein the two or more ferrules are configured such that each ferrule can be removed from the aperture of the respective lug while each electrical wire remains extended into the respective ferrule and while the respective lug remains coupled to the stator assembly.

20. The power tool of claim 15, wherein each of the two or more lugs includes a female receptacle and each of the two or more electrical wires includes a male plug such that each female receptacle is configured to receive a respective male plug among the two or more electrical wires.

\* \* \* \* \*